United States Patent [19]
Seto

[11] Patent Number: 5,483,281
[45] Date of Patent: Jan. 9, 1996

[54] SIGNAL PROCESSING DEVICE FOR A TWO-DIMENSIONAL SOLID-STATE IMAGING ELEMENT

[75] Inventor: Toshiki Seto, Kamakura, Japan

[73] Assignee: Mitsubishi Denki Kabushiki Kaisha, Tokyo, Japan

[21] Appl. No.: 125,588

[22] Filed: Sep. 23, 1993

[30] Foreign Application Priority Data

Sep. 29, 1992 [JP] Japan ................................... 4-259604
Aug. 31, 1993 [JP] Japan ................................... 5-216128

[51] Int. Cl.⁶ .................................................. H04N 5/335
[52] U.S. Cl. ............................ 348/300; 348/301; 348/294
[58] Field of Search ........................ 348/294, 297, 348/300, 311, 207, 320, 322; 257/443; H04N 5/335

[56] References Cited

U.S. PATENT DOCUMENTS

| | | | |
|---|---|---|---|
| 4,580,170 | 4/1986 | Levine | 348/317 |
| 4,794,457 | 12/1988 | Gillet et al. | 348/262 |

FOREIGN PATENT DOCUMENTS

| | | |
|---|---|---|
| 0243157 | 10/1987 | European Pat. Off. . |
| 62-281574 | 12/1987 | Japan . |
| 63-98286 | 4/1988 | Japan . |
| 63-294081 | 11/1988 | Japan . |
| 2-87784 | 3/1990 | Japan . |
| 2-280585 | 11/1990 | Japan . |
| 3-129978 | 6/1991 | Japan . |
| 2151878 | 7/1985 | United Kingdom . |

*Primary Examiner*—Joseph Mancuso
*Assistant Examiner*—Tuan V. Ho
*Attorney, Agent, or Firm*—Wolf, Greenfield & Sacks

[57] ABSTRACT

A signal processing device for providing a large-scale solid-state imaging element composed by combining two solid-state imaging elements operable in field integration mode in the vertical direction. An output from a first amplifier or a zero level depending on a divisional line signal is connected to a + input terminal of a second amplifier coupled to one of the divided pixel regions. As a result, only at a timing corresponding to the divisional line, the outputs from both pixel regions are added by the second amplifier to enable the correction of a TV line to become ½ level.

17 Claims, 6 Drawing Sheets

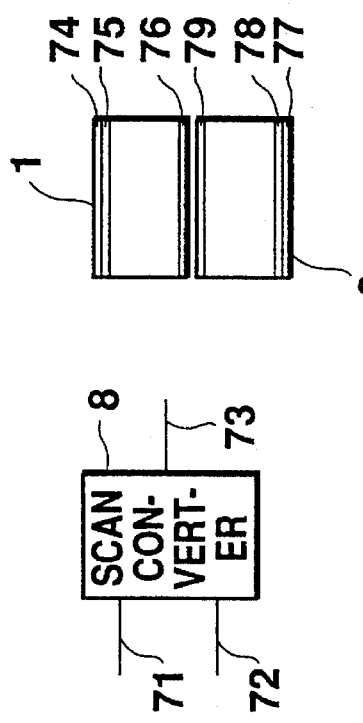
Fig. 4A
Fig. 4B
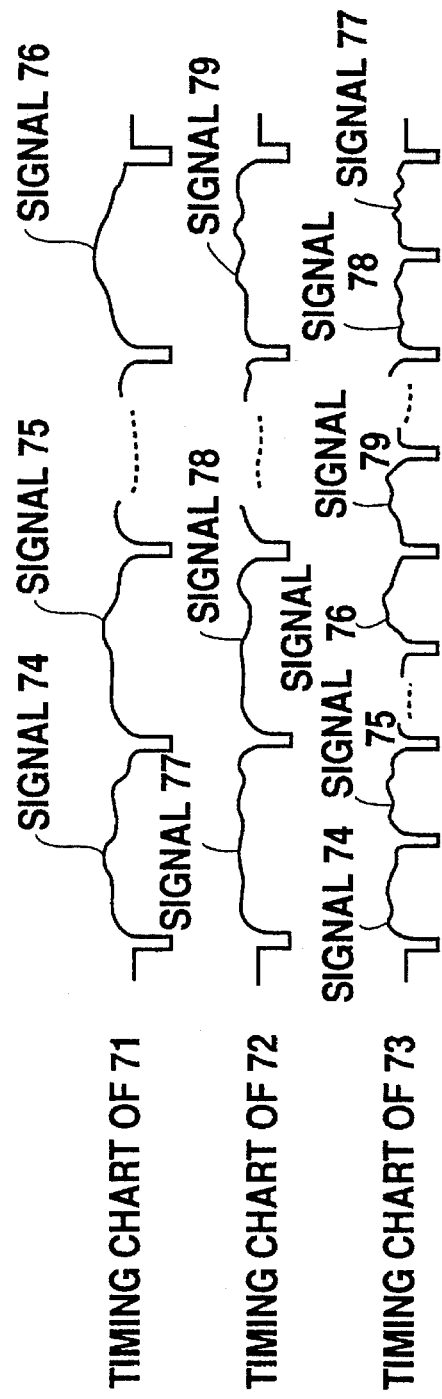
Fig. 4C

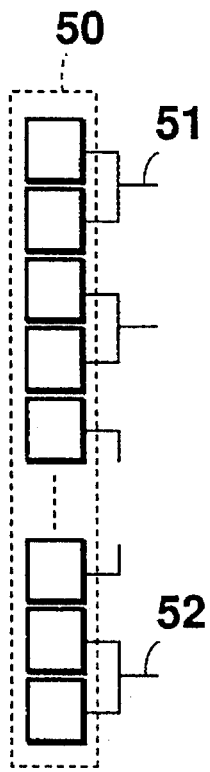
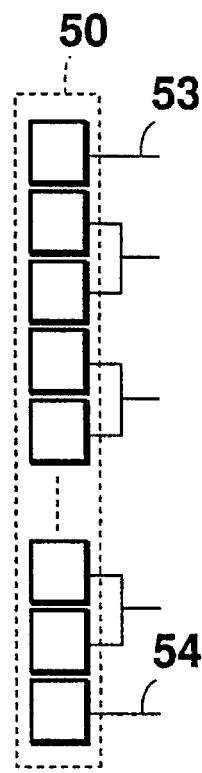
Fig. 5A
(PRIOR ART)
Fig. 5B
(PRIOR ART)
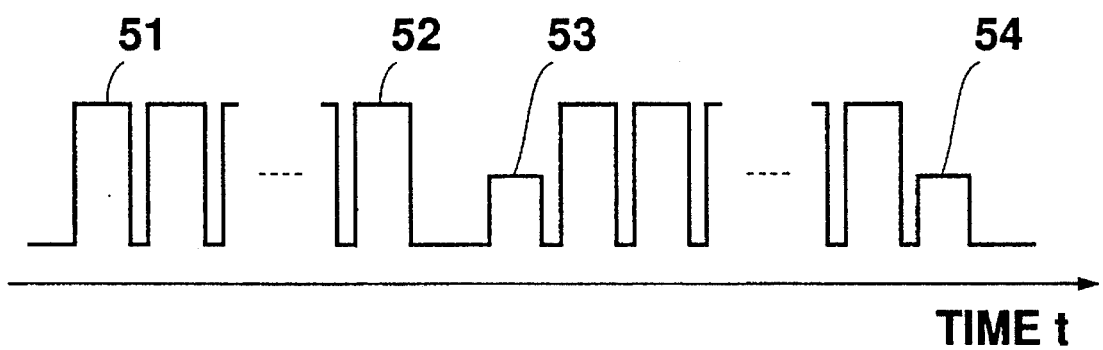
Fig. 5C
(PRIOR ART)

SIGNAL PROCESSING DEVICE FOR A TWO-DIMENSIONAL SOLID-STATE IMAGING ELEMENT

BACKGROUND OF THE INVENTION

1. Field of the Invention

The present invention relates to a signal processing device for a solid-state imaging element;

2. Related Art

FIGS. 5A–5C show an example of operation of a typical solid-state imaging element. FIG. 5A shows a concept for combining pixel outputs in an odd number field, FIG. 5B shows a concept for combining pixel outputs in an even number field, and FIG. 5C shows the timing relationship of pixel outputs in FIG. 5A and FIG. 5B. In these FIGS., the numerals designate respectively: 50, pixel row; 51, pixel output equivalent to a top TV line in the odd number field; 52, pixel output equivalent to a final TV line in the odd number field; 53, a pixel output equivalent to a top TV line in the even number field; and 54, a pixel output equivalent to a final TV line in the even number field.

As shown in these FIGS., a method for allotting a sum of outputs of two pixels to a TV line by alternating the combination depending on the kind of field, not allotting a pixel element to every line, is called field integration mode. While in this mode the resolution in the pixel combining direction (e.g. vertical direction in the shown example) would be somewhat degraded, this method has been widely used because the integration time necessary for obtaining the same sensitivity could be reduced to ½ rendering an excellent time response and the saturated charge amount determined by the pixel area could be duplicated.

On the other hand, enhancing signal reading speed in the element has been a technical obstacle for raising the frame rate. For example, while in the case of an element on the commercial market equivalent to S-VHS, the number of pixels is approximately 300,000 with the reading speed of about 10 MHz, in an element of 2,000,000 pixels for Hi-Vision the reading speed would become more than 70 MHz which is barely realized by the actual CCD transference technique from a standpoint of reading speed. To cope with this problem, there is presently considered a method in which one element is divided into a plurality of pixel areas, and a plurality of output terminals are provided, such that signals in a plurality of areas divided in one frame period are read out in parallel.

FIG. 6 shows an example in which an element is divided in half horizontally. In FIG. 6, the numerals designate respectively: 60 and 61, divided upper and lower pixel regions respectively; 62 and 63, upper and lower horizontal transference sections; 64 and 65, upper and lower output circuits. In the shown embodiment, fundamentally it would be necessary to read out in time series the upper pixel region 60 and the lower pixel region 61 in one frame period. By the division, however, they could be read out timely in parallel. Therefore, in simple words, it has been realized to reduce the reading speed in inverse proportion to the number of division.

This field integration mode has excellent features such as good time response characteristics and large saturated charge amount per pixel due to the reduction to ½ of the integration time for one pixel. If the regional division is made on an element in the field integration mode, however, an discontinuous line would appear on a position of the screen corresponding to the divisional connecting line, since the output level of the top TV line and the final TV line in the even number field is ½. As a result, such element in the field integration mode could not be used for performing regional division.

SUMMARY OF THE INVENTION

It is therefore an object of this invention to provide a signal processing device in which no discontinuous line would appear on a position of the screen corresponding to the divisional line even when driven in the field integration mode.

In this invention, in an element having been subject to the division, an amplifier operating as an adder and a multiplexer at a timing corresponding to the divisional line would add the outputs of the divided pixel regions.

The present invention further features the use of a multiplexer and an amplifier acting as an adder operating at a timing corresponding to a divisional line when an automatic level control function is provided for controlling the screen brightness level so as to be constant in an element that has been region-divided. The amplifier adds the outputs of the divided pixel regions. In addition, an integrator receiving an output from the respective pixel region and integrating the added sub with a certain time constant is provided for each pixel region, and the output from this integrator is used for automatic level control.

The multiplexer and the amplifier correct the top TV line and the final TV line during the even number field in which the level is reduced to ½ by the adding calculation. The integrator adds the outputs from the divided pixel regions, integrates it with a predetermined time constant, and performs automatic level control using this result.

There and other advantages, features and additional objects will be manifest to those versed in the art upon making reference to the following detailed description and accompanying drawings in which a structural embodiment incorporating the principles of this invention is shown by way of illustrative example.

BRIEF DESCRIPTION OF THE DRAWINGS

FIGS. 4A–4C show examples of operation of a scan converter;

FIGS. 5A–5C are explanatory diagrams for an operation of a two-dimensional solid-state imaging element when a pixel region is divided into two parts.

DETAILED DESCRIPTION OF THE PREFERRED EMBODIMENT

Figure 1:
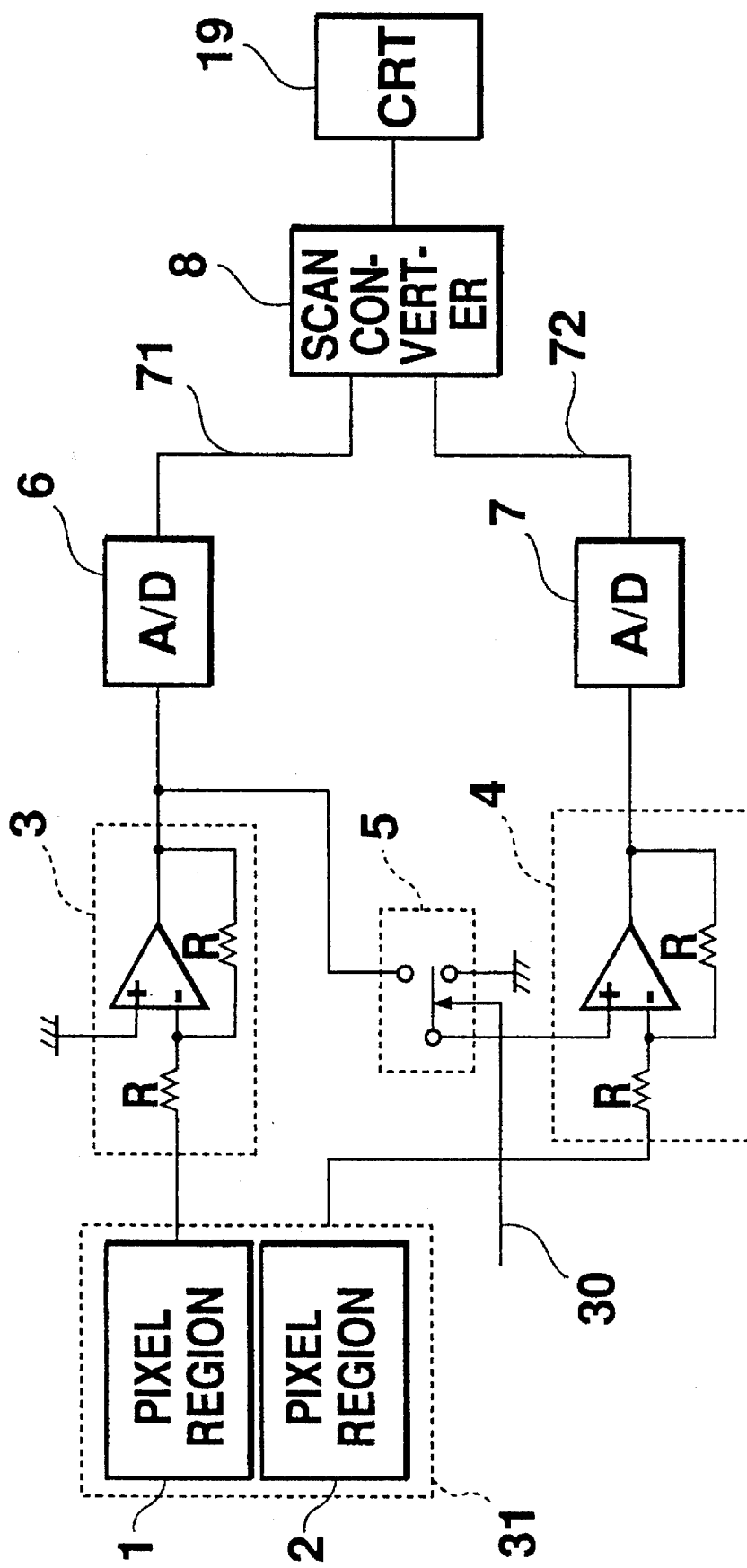
FIG. 1 shows a signal processing device for a solid-state imaging element according to a first embodiment of this invention.

FIG. 1 shows a first embodiment of this invention, in which the numerals designate respectively: 31, a solid-state imaging element; 1, a divided pixel region; 2, another divided pixel region; 3, a first amplifier such as a differential amplifier; 4, a second amplifier; 5, a multiplexer with two inputs and one output; 6, a first A/D converter; 7, a second A/D converter; 8, a scan converter; 19, a CRT; 30, a divisional line timing signal; and R, a resistor. In FIG. 1, the output from the pixel region I passes through the first amplifier 3 to be input to the first A/D converter 6 for digital conversion and enters the scan converter 8. Meanwhile, the output from the other pixel region 2 likewise passes through the second amplifier 4 to be input to the second A/D converter 7 for digital conversion, and enters the scan converter 8. However, the output of the first amplifier 3 or the zero level is input to the + input terminal of the second amplifier 4 through the multiplexer 5. Which one of the two is to be input is controlled by a divisional line timing signal 30. The output of the first amplifier 3 is input to the + input terminal of the second amplifier only at a timing corresponding to the divisional line such that the TV line of ½ level can be corrected.

The scan converter 8 receives the outputs from the first A/D converter 6 and the second A/D converter 7 to convert them into a format to be displayed on the CRT 19. FIGS. 4A–4C show examples of operation of the scan converter 8. FIG. 4A is a block diagram showing input/output of the scan converter 8, FIG. 4B shows a position of a pixel line of the output from the divided pixel region, and FIG. 4C is a timing diagram showing timing of the output from the pixel line. In there FIGS., the numerals designate respectively: 71, an output from the first A/D converter 6; 72, an output from the second A/D converter 7; 73, an output from the scan converter 8; 74, a top pixel line of the pixel region 1; 75, a second pixel line of the pixel region 1; 76, a final pixel line of the pixel region 1; 77, a top pixel line of the pixel region 2; 78, a second pixel line of the pixel region 2; and 79, a final pixel line of the pixel region 2.

The timing charts of the outputs 71 and 72 from the first and the second A/D converters 6 and 7 respectively are output in parallel in order from the top of the pixel regions I and 2. The scan converter 8 rearranges the order of the two inputs, that is the output 71 of the first A/D converter 6 and the output 72 of the second A/D converter 7 in accordance with the scanning order of the CRT 19, and outputs them. Though FIG. 5 shows a case not in field integration mode for simplification, of course the same is true in the field integration mode.

Second Embodiment

Figure 2:
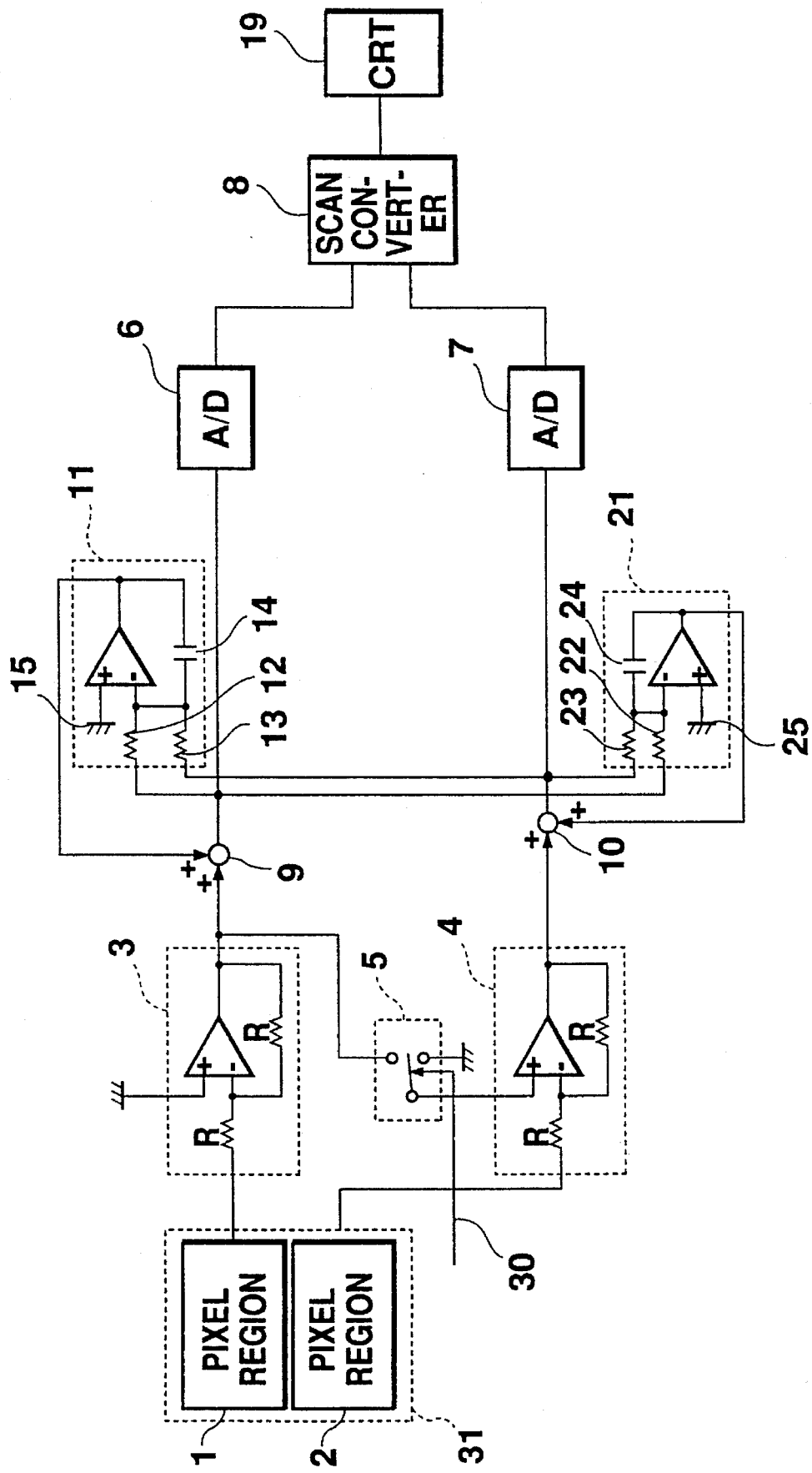
FIG. 2 shows a signal processing device for a solid-state imaging element according to a second embodiment of this invention.

FIG. 2 shows a second embodiment of the present invention, in which the numerals designate respectively: 9, a first adder; 10, a second adder; 11, a first integrator; 12, a first adding resistor; 13, a second adding resistor; 14, a first integrating capacitor; 15, a first reference level; 21, a second integrator; 22, a third adding resistor; 23, a fourth adding resistor; 24, a second integrating capacitor; 25, a second reference level. In FIG. 2, likewise to the first embodiment, the second amplifier 4 and the multiplexer 5 perform the correction of the TV line equivalent to the divisional line to become ½ level.

This embodiment features the provision of an automatic level control function to prevent the screen from being less visible due to the background brightness of the imaging target being too large or too small, or the brightness on the screen being too high or too low.

In FIG. 2, the output of the first adder 9 and the output of the second adder 10 are integrated by the first integrator 11, and the integrated result is input to the first adder 9 for feedback. The integrating constant at this time is determined by the values of the first adding resistor 12, the second adding resistor 13, and the first integrating capacitor 14. Typically, a settling time of the integrator is determined so as not to make the screen brightness variation unnatural. Meanwhile, in another divided pixel region, the output from the first adder 9 and the output from the second adder 10 are integrated in the same manner by the second integrator 21, and the integrated result is input to the second adder 10 for feedback. The integrating constant at this time is determined by the values of the third adding resistor 22, the fourth adding resistor 23, and the second integrating capacitor 24.

In such a circuit structure, the sum of the output levels of the first and second adders 9 and 10 are operated to be equal to the first reference level 15, and the sum of the output levels of the second adder 10 and the first adder 9 are operated to be equal to the second reference level 25. If the first reference level 15 and the second reference level 25 are accorded, the average value of brightness of the two divided screens can be controlled to become a reference level with a time constant.

Third Embodiment

Figure 3:
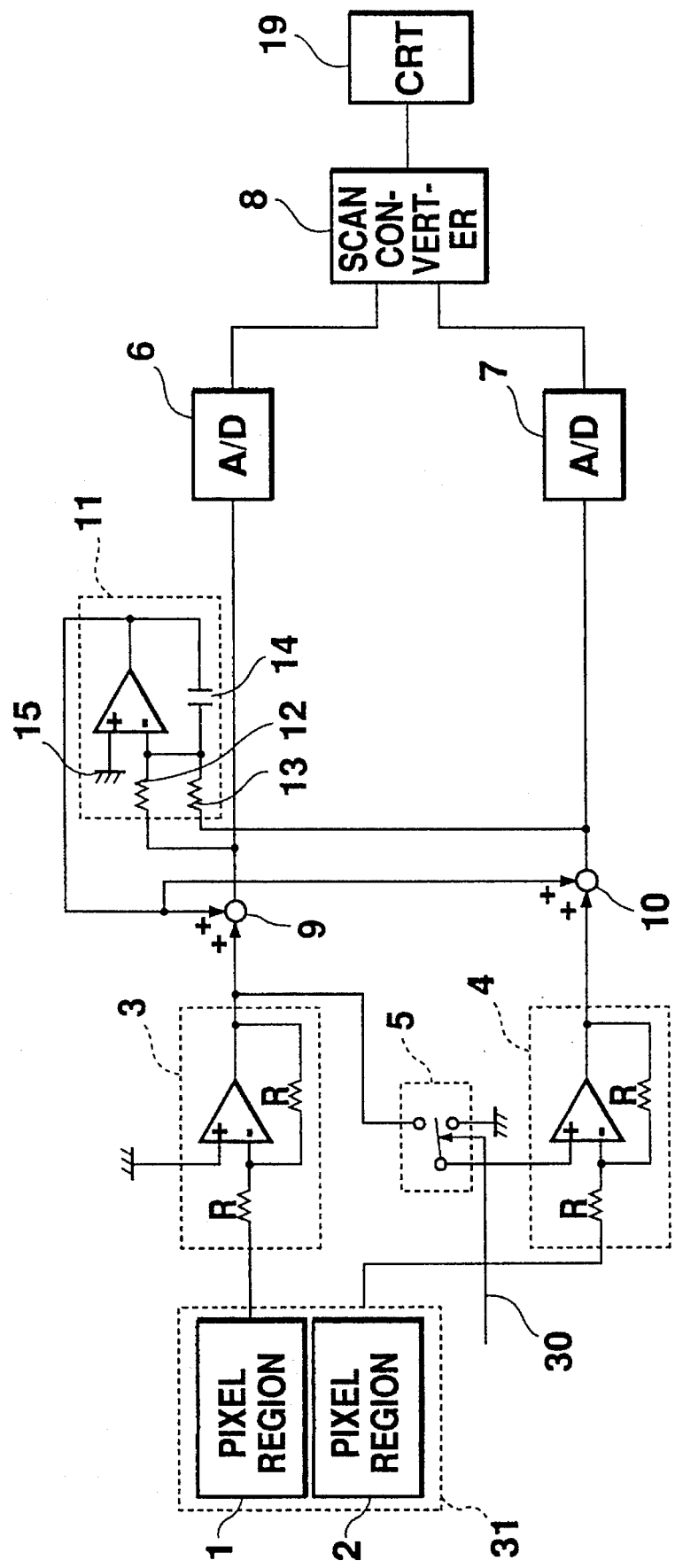
FIG. 3 shows a signal processing device for a solid-state imaging element according to a third embodiment of this invention.
Figure 6:
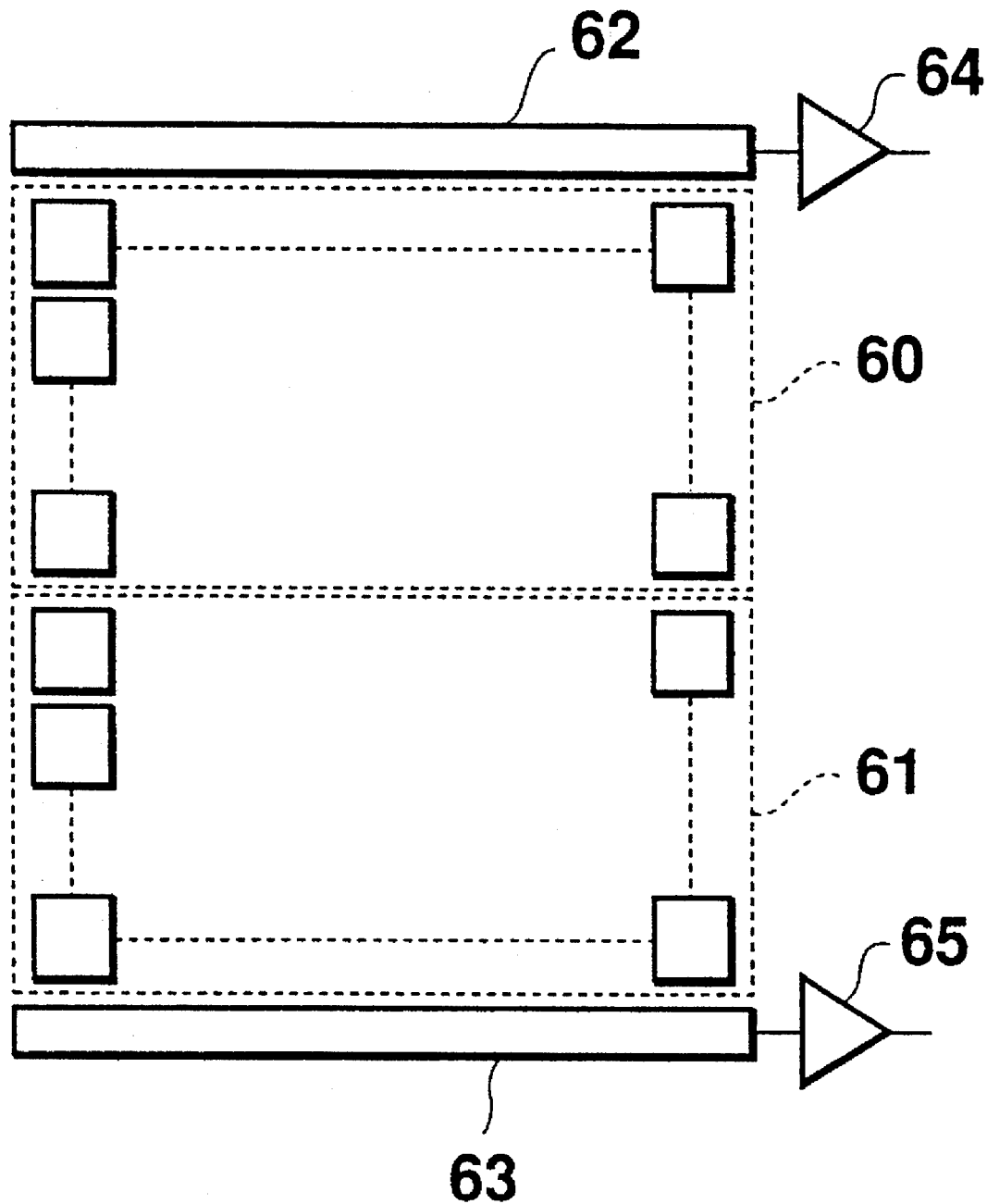
FIG. 6 shows an example in which an element is divided in half horizontally.

FIG. 3 shows a third embodiment of this invention. In FIG. 3, the output of the first adder 9 and the output of the second adder 10 are integrated by the first integrator 11, and the integrated result is input to the first adder 9 for feedback as in the second embodiment. In another divided pixel region, the first integrator 11 is used in common with the former pixel region, and the output of this integrator 11 is input to the second adder 10 for feedback. Thus, the same operation as in the second embodiment can be carried out.

In the first, second and third embodiments, the adders 9 and 10, and the integrators 11 and 21 are composed of analog circuits, but of course it is alternatively possible to provide A/D converters at the output terminals of the first and the second amplifiers 3 and 4 and to compose the adders 9 and 10 and the integrators 11 and 21 of digital circuits.

As mentioned above, according to this invention, in the solid-state imaging element, even when operated in the field integration mode, the outputs of the regions are combined at a timing corresponding to the divisional line, so no discontinuous lines will appear at positions on the screen corresponding to the divisional one.

Further, according to the present invention, the screen brightness level can be automatically controlled so as to make the average brightness value of the divided screen constant.

What is claimed is:

1. A signal processing device for a two-dimensional solid-state imaging element which is composed by mutually coupling first and second solid-state imaging elements in field integration mode in a vertical scanning direction, said device comprising:

a first amplifier connected to an output terminal of said first solid-state imaging element;

a multiplexer for receiving and selectively outputting one of an output of said first amplifier and a predetermined level in response to a controlling signal provided at a predetermined timing;

a second amplifier connected to an output terminal of said second solid-state imaging element to combine an output of said second solid-state imaging element and an output of said multiplexer;

a scan converter for converting the outputs of said first amplifier and said second amplifier into a format to be displayed on a display.

2. A signal processing device for a solid-state imaging element according to claim 1, wherein said first and second amplifiers are composed of differential amplifiers.

3. A signal processing device for a solid-state imaging element according to claim 1, wherein said preset level is a zero level.

4. A signal processing device for a solid-state imaging element according to claim 1, wherein said device further comprises analog-digital converters between said first amplifier and said scan converter, and between said second amplifier and said scan converter.

5. A signal processing device for a solid-state imaging element according to claim 1, wherein the controlling signal controls said multiplexer at a timing corresponding to the mutual connecting portion of said first and second solid-state imaging elements; and said multiplexer selects and outputs the output of said first amplifier at a timing corresponding to the connecting portion, and otherwise outputs said preset level.

6. A signal processing device for a solid-state imaging element according to claim 1, wherein said scan converter outputs the outputs of said first and second amplifiers after rearranging them to a formal order to be indicated on a display device.

7. A signal processing device for a two-dimensional solid-state imaging element which is composed by mutually coupling first and second solid-state imaging elements in field integration mode in a vertical scanning direction, said device comprising:

a first amplifier connected to an output terminal of said first solid-state imaging element;

a multiplexer for receiving and selectively outputting one of an output of said first amplifier and a predetermined level in response to a controlling signal provided at a predetermined timing;

a second amplifier connected to an output terminal of said second solid-state imaging element to combine an output of said second solid-state imaging element and an output of said multiplexer;

a first adder connected to an output terminal of said first amplifier;

a second adder connected to an output terminal of said second amplifier;

a first integrator having a predetermined time constant for integrating the sum of the output of said first adder and the output of the second adder and feeding the integrated sum back to said first adder;

a second integrator having a predetermined time constant for integrating the sum of the output of said first adder and the output of the second adder and feeding the integrated sum back to said second adder; and a scan converter for converting the outputs of said first adder and the output of said second adder into a format to be displayed on a display.

8. A signal processing device for a solid-state imaging element according to claim 7, wherein a reference voltage for the first integrator and a reference voltage for the second integrator are equal.

9. A signal processing device for a solid-state imaging element according to claim 7, wherein analog-digital converters are provided between said first adder and said scan converter and between said second adder and said scan converter.

10. A signal processing device for a solid-state imaging element according to claim 7, wherein analog-digital converters are provided between said first amplifier and said first adder and between said second amplifier and said second adder.

11. A signal processing device for a solid-state imaging element according to claim 7, wherein said controlling signal is a signal for controlling said multiplexer at a timing corresponding to a connecting portion between said first solid-state imaging element and said second solid-state imaging element;

said multiplexer selects and outputs the output of said first amplifier at a timing corresponding to said connecting portion, and otherwise outputs the predetermined level.

12. A signal processing device for a solid-state imaging element according to claim 7, wherein said scan converter outputs the outputs of said first and second amplifiers after rearranging them to a formal order to be indicated on a display device.

13. A signal processing device for a two-dimensional solid-state imaging element which is composed by mutually coupling first and second solid-state imaging elements in field integration mode in a vertical scanning direction, said device comprising:

a first amplifier connected to an output terminal of said first solid-state imaging element;

a multiplexer for receiving and selectively outputting one of an output of said first amplifier and a predetermined level in response to a controlling signal provided at a predetermined timing;

a second amplifier connected to an output terminal of said second solid-state imaging element to combine an output of said second solid-state imaging element and an output of said multiplexer;

a first adder connected to an output terminal of said first amplifier;

a second adder connected to an output terminal of said second amplifier;

an integrator having a predetermined time constant for integrating an output of said first adder and an output of said second adder for feeding it back to said first and second adder; and a scan converter for converting the output of said first adder and the output of said second adder into a format to be displayed on a display.

14. A signal processing device for a solid state imaging element according to claim 13, further comprising:

a first analog-digital converter between said first adder and said scan converter, and a second analog-digital converter between said second adder and said scan converter.

15. A signal processing device for a solid state imaging element according to claim 13, further comprising:

a first analog-digital converter between said first amplifier and said first adder, and a second analog-digital converter between said second amplifier and said second adder.

16. A signal processing device for a solid-state imaging element according to claim 13, wherein said controlling signal is a signal for controlling said multiplexer at a timing corresponding to a connecting portion between said first solid-state imaging element and said second solid-state imaging element; and said multiplexer selects and outputs the output of said first amplifier at a timing corresponding to the connecting portion, and otherwise outputs the predetermined level.

17. A signal processing device for a solid-state imaging element according to claim 13, wherein said scan converter outputs the outputs of said first and second amplifiers after rearranging them to a formal order to be indicated on a display device.

* * * * *